United States Patent Office 2,898,203
Patented Aug. 4, 1959

2,898,203

REMOVAL OF CHLORIDE FROM AQUEOUS SOLUTIONS

Wallace W. Schulz, Richland, Wash., assignor to the United States of America as represented by the United States Atomic Energy Commission No Drawing. Application October 4, 1954
Serial No. 460,287

3 Claims. (Cl. 23—312)

This invention deals with the removal of chlorides from aqueous solutions.

Aqueous waste solutions as they are obtained, for instance, in the recovery of uranium and plutonium from neutron-irradiated uranium are usually subjected to fractional distillation firstly in order to recover the nitric acid which is present in such waste solutions and secondly in order to obtain a more concentrated solution of the fission products which makes disposal of the latter simpler and less expensive. However, in most cases there was one problem connected with the distillation step, namely, that of corrosion; even stainless steel equipment was found to corrode to a considerable degree. The cause of this undesirable phenomenon was found to be the fact that the solutions contained chloride derived from impure chemicals that were used during the various previous processing steps and possibly also from carbon tetrachloride (by hydrolysis) when used as a diluent for tributyl phosphate in solvent extraction. The chloride content in the waste solutions just described averages about 0.6 gram $Cl^-$ (present as chloride) per liter of solution.

It is an object of this invention to provide a process for the removal of chlorides from aqueous solutions which is very simple.

It is also an object of this invention to treat chloride-containing aqueous solutions so that they can be concentrated by distillation without causing corrosion of the equipment.

These and other objects are accomplished by contacting the aqueous chloride-containing solution with a benzene solution of phenyl mercuric acetate whereby the chloride anions are taken up by a solvent extract phase, and separating said solvent extract phase from said aqueous solution.

Due to a rather low solubility the most concentrated solution of phenyl mercuric acetate that could be obtained in benzene was 0.007 M; however, solutions above 0.005 M were found to be unstable for a long period of time. The solubility of the phenyl mercuric acetate is increased to a value corresponding to a 0.025 M solution, though, by the addition of glacial acetic acid in a quantity, for instance, to yield a concentration of 4%.

The extraction of the chloride is also improved by the addition of glacial acetic acid. This is obvious from Example I. This example and the ones given later are not intended to limit the invention to the details described therein but merely to illustrate the process.

*Example I*

A synthetic aqueous waste solution containing 0.58 gram $Cl^-$, in the form of chloride, per liter of solution was used for a number of extractions carried out at identical conditions except for the concentration of the extractant. The chlorine distribution ratio (organic/aqueous) was determined in each run by analyzing the aqueous raffinates for their chlorine contents.

While an extractant containing phenyl mercuric acetate in a concentration of 0.001 M in benzene yielded a distribution ratio of 0.3, a 0.007 M extractant resulted in a distribution ratio of 1.0. An extractant 0.005 M in phenyl mercuric acetate and also containing 4% of glacial acetic acid, although having an intermediate concentration, brought about the highest extraction value, namely, a distribution ratio of 1.4.

*Example II*

A portion of the same synthetic aqueous waste solution used in Example I was contacted four times, each time with an equal volume of a 0.005 M solution of phenyl mercuric acetate in benzene. After the four extractions 98% of the chlorine originally present in the waste solution had been removed.

*Example III*

One volume of a synthetic aqueous waste solution containing 0.86 gram of chlorine in the form of chloride per liter of solution was contacted twice, each time with two volumes of 0.005 M phenyl mercuric acetate in benzene. No chlorine could be discovered in the aqueous solution thus treated indicating quantitative chlorine removal. Analyses furthermore showed that uranium had not been extracted from the aqueous solution and that no mercury had been transferred from the organic to the aqueous phase.

It will be understood that this invention is susceptible to various modifications and changes and not limited by or to the details given herein, but that it is merely limited by the scope of the appended claims.

What is claimed is:

1. A process of removing chloride anions from an aqueous solution, comprising contacting said solution with a benzene solution of phenyl mercuric acetate whereby said chloride anions are taken up by a solvent extract phase, and separating said solvent extract phase from said aqueous solution.

2. The process of claim 1 wherein said benzene solution is about 0.005 M in phenyl mercuric acetate.

3. The process of claim 2 wherein said benzene solution contains about 4% glacial acetic acid.

No references cited.